(12) United States Patent
Gordon

(10) Patent No.: US 11,065,929 B2
(45) Date of Patent: Jul. 20, 2021

(54) LOW SUSPENSION ARM STRUT COUPLING

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 0 days.

(21) Appl. No.: 16/588,805

(22) Filed: Sep. 30, 2019

(65) Prior Publication Data

US 2020/0023702 A1     Jan. 23, 2020

Related U.S. Application Data

(63) Continuation of application No. 15/625,660, filed on Jun. 16, 2017, now Pat. No. 10,442,263.

(Continued)

(51) Int. Cl.
| | |
|---|---|
| *B60G 7/00* | (2006.01) |
| *B60G 3/20* | (2006.01) |
| *B60G 17/00* | (2006.01) |
| *B62D 7/16* | (2006.01) |
| *B60G 7/02* | (2006.01) |

(52) U.S. Cl.
CPC ............... *B60G 7/001* (2013.01); *B60G 3/20* (2013.01); *B60G 3/202* (2013.01); *B60G 7/005* (2013.01); *B60G 7/008* (2013.01); *B60G 7/02* (2013.01); *B60G 17/00* (2013.01); *B62D 7/166* (2013.01); *B60G 2200/144* (2013.01); *B60G 2200/156* (2013.01); *B60G 2200/44* (2013.01); *B60G 2202/312* (2013.01); *B60G 2204/143* (2013.01); *B60G 2204/148* (2013.01);

(Continued)

(58) Field of Classification Search
CPC .......... B60G 7/001; B60G 7/005; B60G 3/20; B60G 7/02; B60G 7/008; B60G 17/00; B60G 3/202; B60G 2200/44; B60G 2200/156; B60G 2204/148; B60G 2204/143; B60G 2204/416; B60G 2202/312; B60G 2200/144; B60G 2204/62; B60G 2204/30; B60G 2300/07; B62D 7/166

See application file for complete search history.

(56) References Cited

U.S. PATENT DOCUMENTS

| | | |
|---|---|---|
| 3,007,728 A | 11/1961 | Hoffman |
| 4,467,666 A | 8/1984 | Ackermann |
| (Continued) | | |

OTHER PUBLICATIONS

U.S. Appl. No. 15/625,813, filed Jun. 16, 2017 Non-Final Office Action dated Oct. 4, 2018.

*Primary Examiner* — Darlene P Condra
(74) *Attorney, Agent, or Firm* — Rutan & Tucker LLP; Hani Z. Sayed

(57) ABSTRACT

A low suspension arm strut coupling is provided for a suspension of an off-road vehicle. The suspension comprises a lower suspension arm that is hingedly coupled between a chassis of the off-road vehicle and a spindle assembly that is coupled with a front wheel. An upper suspension arm is hingedly coupled between the chassis and the spindle assembly. A strut is coupled between the lower suspension arm and the chassis. A lower pivot couples the strut to the lower suspension, and an upper pivot couples the strut to the chassis. The upper and lower pivots provide a lower center of gravity of the off-road vehicle and a relatively smaller shock angle. The lower suspension arm is reinforced to withstand forces due to movement of the front wheel and operation of the strut in response to travel over terrain.

3 Claims, 6 Drawing Sheets

Related U.S. Application Data

(60) Provisional application No. 62/480,960, filed on Apr. 3, 2017.

(52) U.S. Cl.
CPC .... *B60G 2204/30* (2013.01); *B60G 2204/416* (2013.01); *B60G 2204/62* (2013.01); *B60G 2300/07* (2013.01)

(56) References Cited

U.S. PATENT DOCUMENTS

| | | |
|---|---|---|
| 4,550,926 A | 11/1985 | MacIsaac |
| 5,601,304 A | 2/1997 | Tilly et al. |
| 2005/0017472 A1 | 1/2005 | Kondo et al. |
| 2007/0114747 A1 | 5/2007 | Morgan |
| 2007/0256659 A1 | 11/2007 | Anderson et al. |
| 2008/0303234 A1 | 12/2008 | McCann |
| 2008/0303237 A1 | 12/2008 | Preijert |
| 2009/0295113 A1 | 12/2009 | Inoue et al. |
| 2011/0048833 A1 | 3/2011 | Schapf et al. |
| 2012/0241237 A1* | 9/2012 | Holroyd .................. B62D 21/18 180/210 |
| 2012/0319336 A1 | 12/2012 | Yamada et al. |
| 2012/0326410 A1* | 12/2012 | West ........................ B60G 3/20 280/124.109 |
| 2013/0175106 A1 | 7/2013 | Bedard et al. |
| 2014/0090935 A1 | 4/2014 | Pongo et al. |
| 2014/0091538 A1 | 4/2014 | Matsuda et al. |
| 2017/0320522 A1 | 11/2017 | Lorenz et al. |
| 2018/0281538 A1 | 10/2018 | Gordon |
| 2018/0290511 A1 | 10/2018 | Gordon |

* cited by examiner

LOW SUSPENSION ARM STRUT COUPLING

PRIORITY

This application is a Continuation of U.S. patent application Ser. No. 15/625,660, filed Jun. 16, 2017, which claims the benefit of and priority to U.S. Provisional Application No. 62/480,960, filed Apr. 1, 2017, both of which are incorporated by reference in their entirety herein.

FIELD

The field of the present disclosure generally relates to vehicle suspension systems. More particularly, the field of the invention relates to an off-road front suspension system configured to improve the mechanical strength and performance of off-road drivetrains.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scrub, and the like.

Double wishbone suspensions may be used in a wide variety of vehicles, including heavy-duty vehicles, as well as many off-road vehicles, as shown in FIG. 1. FIG. 1 shows an off-road vehicle 100 that is of a Side by Side variety. The Side by Side is a four-wheel drive off-road vehicle that typically seats between two and six occupants, and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms", although the arms may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

A low suspension arm strut coupling is provided for a suspension of an off-road vehicle. The suspension generally couples a front wheel with a chassis of the off-road vehicle and comprises an upper suspension arm hingedly coupled between the chassis and a spindle assembly that is coupled with the front wheel. A lower suspension arm is hingedly coupled between the chassis and the spindle assembly. A strut is coupled between the lower suspension arm and the chassis. The strut is coupled between the lower suspension arm and the chassis by way of a lower pivot mounted to the lower suspension arm and an upper pivot mounted to the chassis. The lower pivot and the upper pivot are configured to provide a lower center of gravity of the off-road vehicle and a relatively smaller shock angle. The lower suspension arm is reinforced to provide a structural integrity suitable to withstand forces due to movement of the front wheel and operation of the strut in response to travel over terrain.

In an exemplary embodiment, a suspension for coupling a front wheel with a chassis of an off-road vehicle comprises an upper suspension arm hingedly coupled between the chassis and a spindle assembly that is coupled with the front wheel; a lower suspension arm hingedly coupled between the chassis and the spindle assembly; a strut coupled between the lower suspension arm and the chassis; and a steering rod comprising a rod-end joint coupled with a leading portion of the spindle assembly.

In another exemplary embodiment, the strut is coupled between the lower suspension arm and the chassis by way of a lower pivot mounted to the lower suspension arm and an upper pivot mounted to the chassis. In another exemplary embodiment, the lower pivot and the upper pivot are configured to provide a lower center of gravity of the off-road vehicle and a relatively smaller shock angle. In another exemplary embodiment, the lower pivot and the upper pivot are configured to provide a substantially 90-degree angle between the strut and the lower suspension arm during full compression of the strut. In another exemplary embodiment, the strut is configured to dampen vertical motion of the lower suspension arm and the upper suspension arm due to movement of the front wheel in response to travel over terrain. In another exemplary embodiment, the lower suspension arm is reinforced to provide a structural integrity suitable to withstand forces due to movement of the front wheel and operation of the strut in response to travel over terrain.

In another exemplary embodiment, each of the upper suspension arm and the lower suspension arm is comprised of two inboard mounting points to the chassis and an outboard rod-end joint to the spindle assembly. In another exemplary embodiment, the inboard mounting points are comprised of bushing joints configured to allow vertical rotation of the lower and upper suspension arms with respect to the chassis.

In another exemplary embodiment, the upper suspension arm is configured to facilitate coupling the strut between the lower suspension arm and the chassis. In another exemplary embodiment, the upper suspension arm is coupled with the chassis forward of a coupling between the lower suspension arm and the chassis to provided clearance for extending the strut from the lower suspension arm to the chassis. In another exemplary embodiment, the upper suspension arm is configured in the form of a J-arm. In another exemplary embodiment, the upper suspension arm comprises inboard mounting joints that are coupled with the chassis forward of inboard mounting joints comprising the lower suspension arm, such that at least a rear portion of the upper suspension arm is disposed forwardly of a portion of the lower suspension arm. In another exemplary embodiment, the strut is coupled with the portion of the lower suspension arm and the chassis.

In an exemplary embodiment, a lower suspension arm for a front suspension of an off-road vehicle comprises one or more inboard mounting points to a chassis of the vehicle; an outboard mounting point to a spindle assembly coupled with a front wheel; and a pivot configured to receive a lower end of a strut. In another exemplary embodiment, the one or more inboard mounting points are comprised of bushing joints configured to allow vertical rotation of the lower suspension arm with respect to the chassis. In another exemplary embodiment, the outboard mounting point is configured to receive a rod-end joint coupled with the spindle assembly. In another exemplary embodiment, the outboard mounting point is configured to receive a weld-in tube end. In another exemplary embodiment, the outboard mounting point is configured to receive a threaded shank comprising the rod-end joint and a lock-nut to fixate the threaded shank with respect to the lower suspension arm.

In another exemplary embodiment, the pivot is configured to provide a substantially 90-degree angle between the strut and the lower suspension arm during full compression of the strut. In another exemplary embodiment, the strut is configured to dampen vertical motion of the lower suspension arm due to movement of the front wheel in response to travel over terrain. In another exemplary embodiment, the lower suspension arm is reinforced to provide a structural integrity suitable to withstand forces due to the movement of the front wheel and operation of the strut in response to travel over terrain.

BRIEF DESCRIPTION OF THE DRAWINGS

The drawings refer to embodiments of the present disclosure in which.

Figure 1:
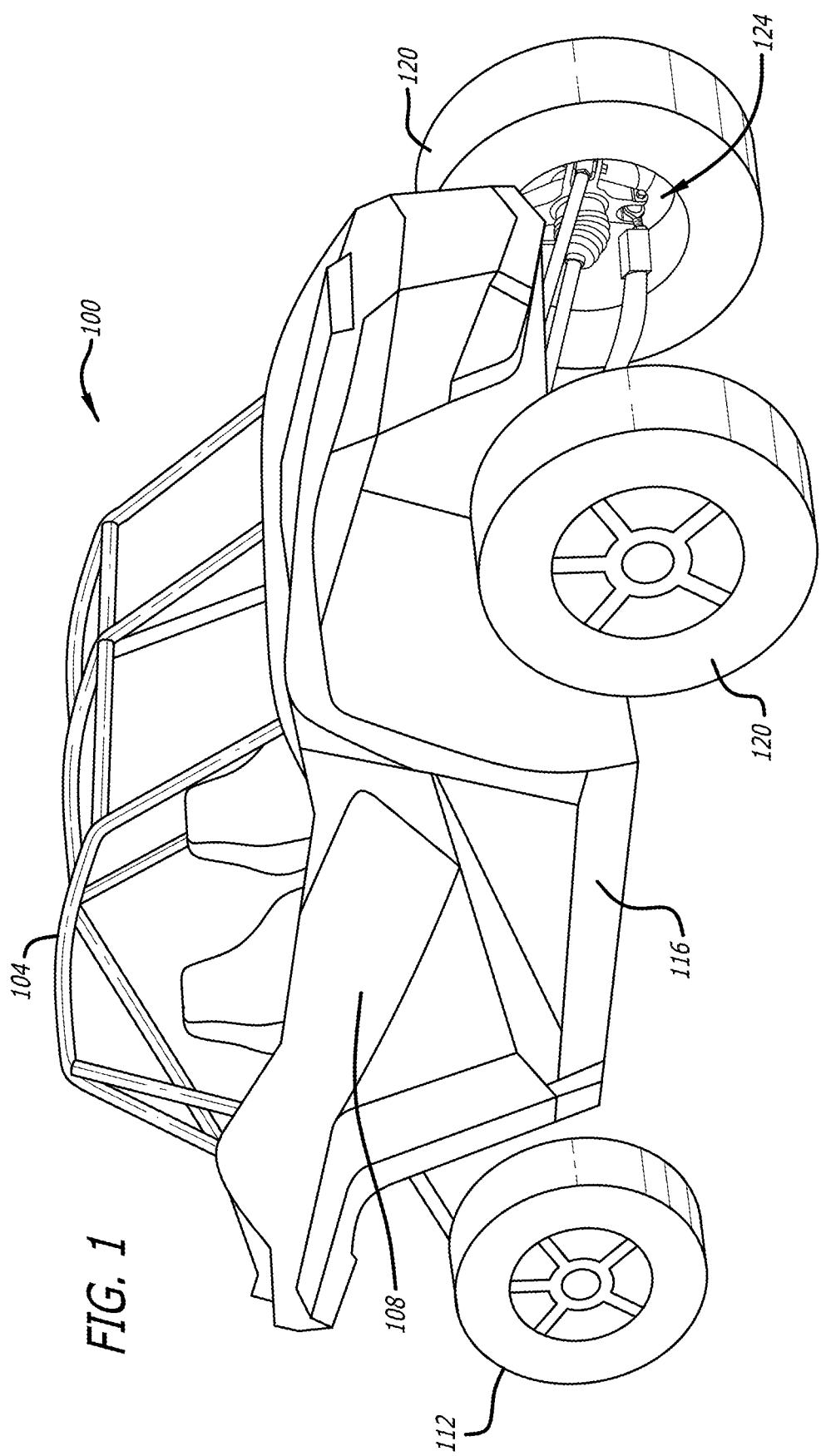
FIG. 1 illustrates an exemplary embodiment of an off-road vehicle that is particularly suitable for implementation of an off-road front suspension system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a suspension for coupling a front wheel with a chassis of an off-road vehicle. The suspension comprises an upper suspension arm that includes two inboard mounting points to the chassis and one outboard rod-end joint to a spindle assembly coupled with the front wheel. A lower suspension arm comprises two inboard mounting points to the chassis and one outboard rod-end joint to the spindle assembly. Each outboard rod-end joint is comprised of a ball that is rotatable within a casing that is threadably coupled with each of the upper and lower suspension arms. A bolt fastens each of the balls between a pair of parallel prongs extending from the spindle assembly, such that the upper and lower suspension arms may pivot with respect to the spindle assembly during vertical motion of the spindle assembly, as well as during horizontal rotation of the spindle assembly due to steering. A strut comprising a shock absorber and a coil spring is coupled between the lower suspension arm and the chassis. The upper suspension arm is configured to facilitate coupling the strut between the lower suspension arm and the chassis. A steering rod is coupled with the spindle assembly by way of a steering rod-end joint that is disposed at a front of the spindle assembly. The steering rod-end joint is comprised of a ball that is rotatable within a casing that is threadably coupled with the steering rod. A pair of parallel prongs and a bolt hingedly couple the steering rod-end with the spindle assembly, such that the steering rod-end joint allows vertical and horizontal rotational motion of the spindle assembly during operation of the off-road vehicle. The steering rod-end joint is coupled with the spindle assembly forward of a drive axle, thereby decreasing leverage of the front wheel on the steering rod and substantially eliminating bump steer that may occur due to rough terrain.

FIG. 1 shows an off-road vehicle 100 that is particularly suitable for implementation of an off-road front suspension system in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of the front suspension system disclosed herein. It should be understood, however, that the front suspension system of the present disclosure is not to be limited to the off-road vehicle 100, but rather the front suspension system may be incorporated into a wide variety of off-road vehicles, other than UTVs, without limitation.

Figure 2:
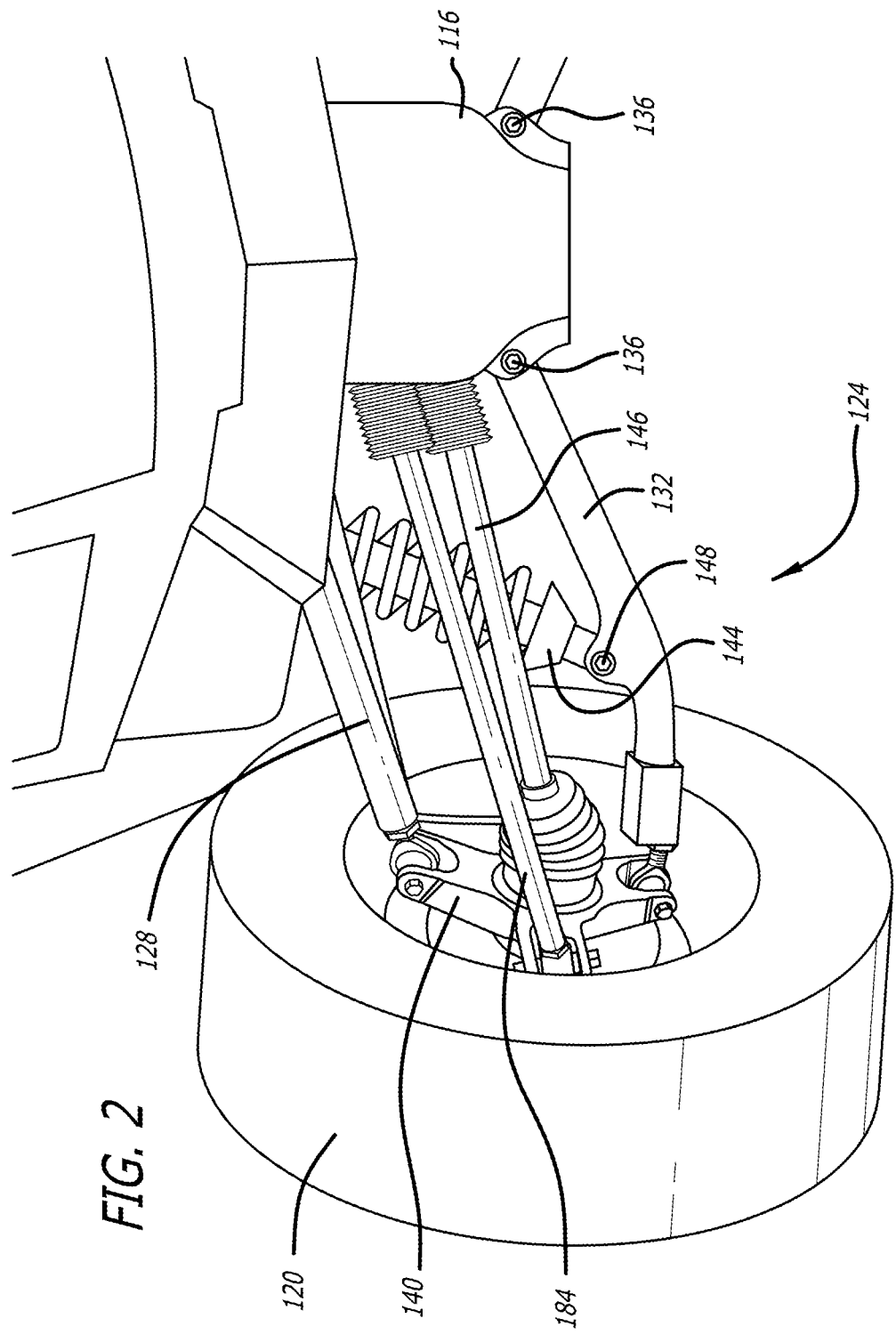
FIG. 2 illustrates a front view of a front suspension system that is configured to couple a front wheel with a passenger side of an off-road vehicle.

FIG. 2 illustrates a front view of a front suspension system 124 that is configured to couple the front wheel 120 with a passenger side of the off-road vehicle 100. The front suspension system 124 is comprised of an upper suspension arm 128 and a lower suspension arm 132 that couple the front wheel 120 with the chassis 116. Each of the upper and lower suspension arms 128, 132 comprises two inboard mounting points 136 to the chassis 116 and one outboard mounting joint to a spindle assembly 140. As will be recognized, the upper and lower suspension arms 128, 132 generally are of a double wishbone variety of suspension that facilitates controlling various parameters affecting the orientation of the wheel 120 with respect to the off-road vehicle 100, such as, by way of non-limiting example, camber angle, caster angle, toe pattern, roll center height, scrub radius, and scuff.

It should be understood that although the front suspension system 124 is disclosed specifically in connection with the passenger side of the off-road vehicle 100, a driver side front suspension system is to be coupled with a driver side of the off-road vehicle. It should be further understood that the driver side front suspension system is substantially identical to the front suspension system 124, with the exception that the driver side front suspension system is configured specifically to operate with the driver side of the off-road vehicle 100. As will be appreciated, therefore, the driver side front suspension system and the front suspension system 124 may be configured as reflections of one another across a longitudinal midline of the off-road vehicle 100.

As shown in FIG. 2, a strut 144 that is comprised of a shock absorber and a coil spring is mounted to the lower suspension arm 132 by way of a lower pivot 148. An upper pivot (not shown) couples a top of the strut 144 to the chassis 116. The strut 144 is configured to control vertical motion of the front suspension system 124 due to movement of the front wheel 120 as the off-road vehicle 100 travels over bumpy terrain. The upper suspension arm 128 may be suitably configured, such as in the form of a J-arm, so as to facilitate coupling the strut 144 between the lower suspension arm 132 and the chassis 116 in lieu of being coupled between the upper suspension arm and the chassis.

In some embodiments, coupling the strut 144 with the lower suspension arm 132 positions the strut at between 8 inches and 10 inches lower, with respect to the chassis 116, than the position of the strut when coupled with the upper suspension arm 128. Experimental observation has shown that the lower position of the strut 144 generally facilitates a lower center of gravity of the off-road vehicle 100 and a relatively smaller shock angle, as well as eliminating a need for extending the strut towers through and above a hood of the off-road vehicle 100. In one embodiment, the coupling of the strut 144 with the lower suspension arm 132 positions the strut at substantially 90-degrees with respect to the lower pivot 148 and the upper pivot during full compression of the strut.

Figure 3:
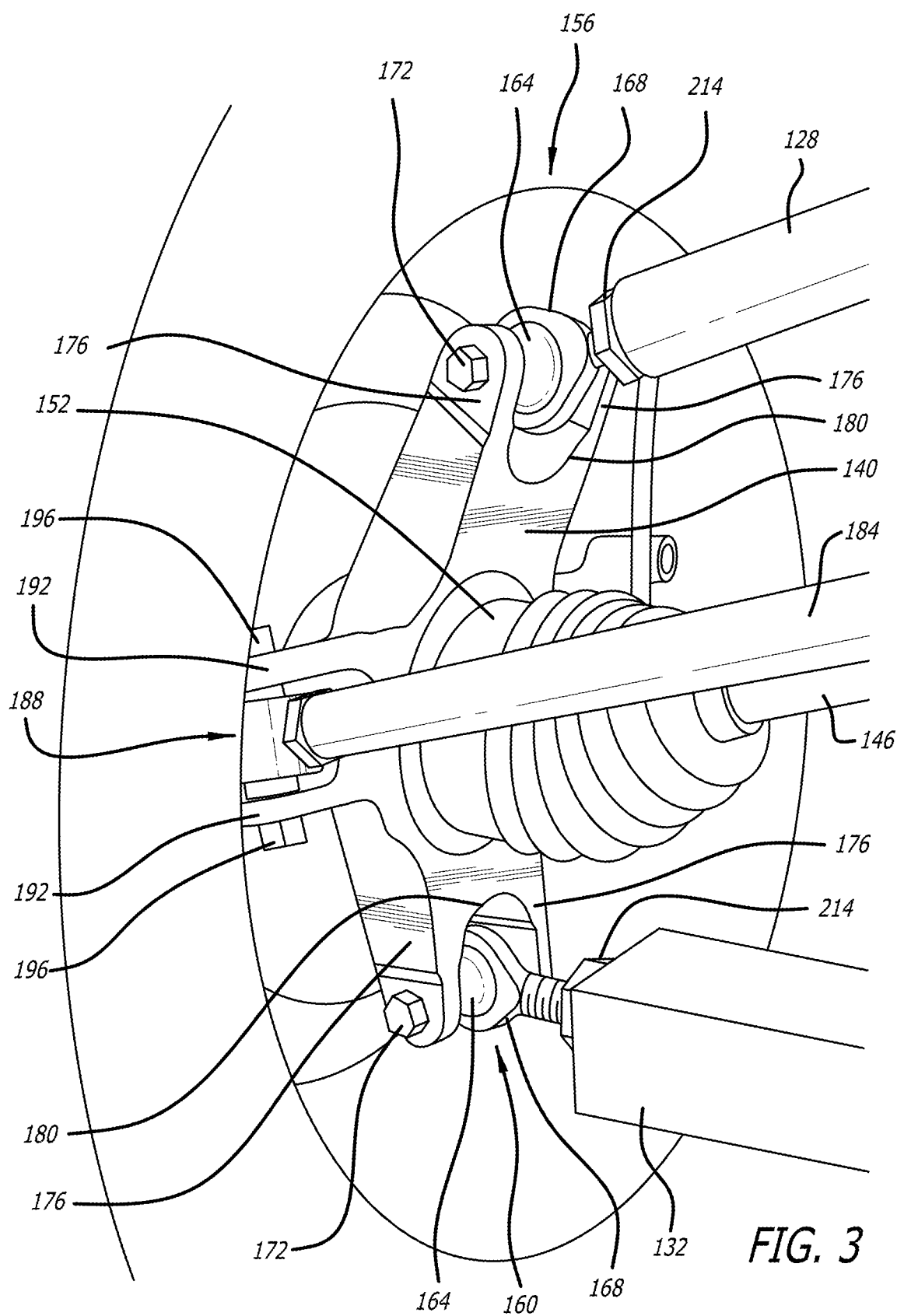
FIG. 3 illustrates a front view of an exemplary embodiment of outboard rod-end joints coupling a spindle assembly with upper and lower suspension arms.

As shown in FIG. 2, a drive axle 146 is coupled between a transaxle and the front wheel 120. The drive axle 146 is configured to conduct torque from the transaxle to the front wheel 120 and accommodate vertical pivoting motion of the front suspension assembly 124 in response to road conditions. As best shown in FIG. 3, the drive axle 146 is comprised of a constant velocity (CV) joint 152 that is coupled with the spindle assembly 140 onto which the front wheel is mounted. The CV joint 152 allows uninterrupted torque transmission from the transaxle to the front wheel 120 during vertical pivoting of the front suspension assembly 124 due to road conditions. As will be appreciated, the spindle assembly 140 generally supports the CV joint 152 and the front wheel 120 by way of one or more roller bearings (not shown).

As further shown in FIG. 3, the spindle assembly 140 is pivotally coupled with the upper and lower suspension arms 128, 132. An upper rod-end joint 156 couples the upper suspension arm 128 to the spindle assembly 140, and a lower rod-end joint 160 couples the lower suspension arm 132 to the spindle assembly. Preferably, the upper and lower rod-end joints 156, 160 are of a Heim-joint variety, wherein each of the joints is comprised of a ball 164 that is movable within a casing 168 that is threadably coupled with each of the suspension arms 128, 132. A bolt 172 fastens each of the balls 164 between a pair of parallel prongs 176 extending from the spindle assembly 140. It is contemplated that a recess 180 disposed between each pair of parallel prongs 176 has a shape and a size that are suitable to fixedly receive the ball 164 and allow for a desired degree of movement of the casing 168 on the ball. Thus, during vertical motion of the spindle assembly 140, as well as during horizontal rotation of the spindle assembly 140 due to steering, the balls 164 rotate within their respective casings 168, allowing the upper and lower suspension arms 128, 132 to pivot with respect to the spindle assembly 140.

Upon inspection of FIG. 3, it will be recognized that the upper and lower rod-end joints 156, 160 are similar to Clevis fasteners. For example, each pair of parallel prongs 176 is similar to a Clevis, the bolt 172 is similar to a Clevis pin, and the ball 164 and casing 168 are similar to a tang. As such, each of the upper and lower rod-end points 156, 160 provides two shear planes that may withstand twice the incident force that may be withstood by single shear joints that are used in conventional front suspensions.

In the embodiment illustrated in FIG. 3, a steering rod 184 couples the spindle assembly 140 with a steering system of the off-road vehicle 100. The steering rod 184 is coupled with the spindle assembly 140 by way of a rod-end joint 188 that is similar to the upper and lower rod-end joints 156, 160. It is contemplated, therefore, that the rod-end joint 188 may be of the Heim-joint variety or may be of a bushing variety, as desired. A pair of parallel prongs 192 and a bolt 196 hingedly couple the steering rod 184 with the spindle assembly 140. As will be appreciated, the rod-end joint 188 allows vertical and horizontal rotational motion of the spindle assembly 140 during operation of the off-road vehicle 100.

In the embodiment illustrated in FIG. 3, the rod-end joint 188 is coupled with the spindle assembly 140 forward of the drive axle 146, thereby providing a leading-edge steering system to the off-road vehicle 100. Experimentation has demonstrated that the leading-edge steering system shown in FIG. 3 advantageously decreases leverage of the front wheel 120 on the rod-end joint 188 and the steering rod 184, thereby substantially eliminating bump steer that may occur due to forces exerted on the front wheel by rough terrain.

Figure 3A:
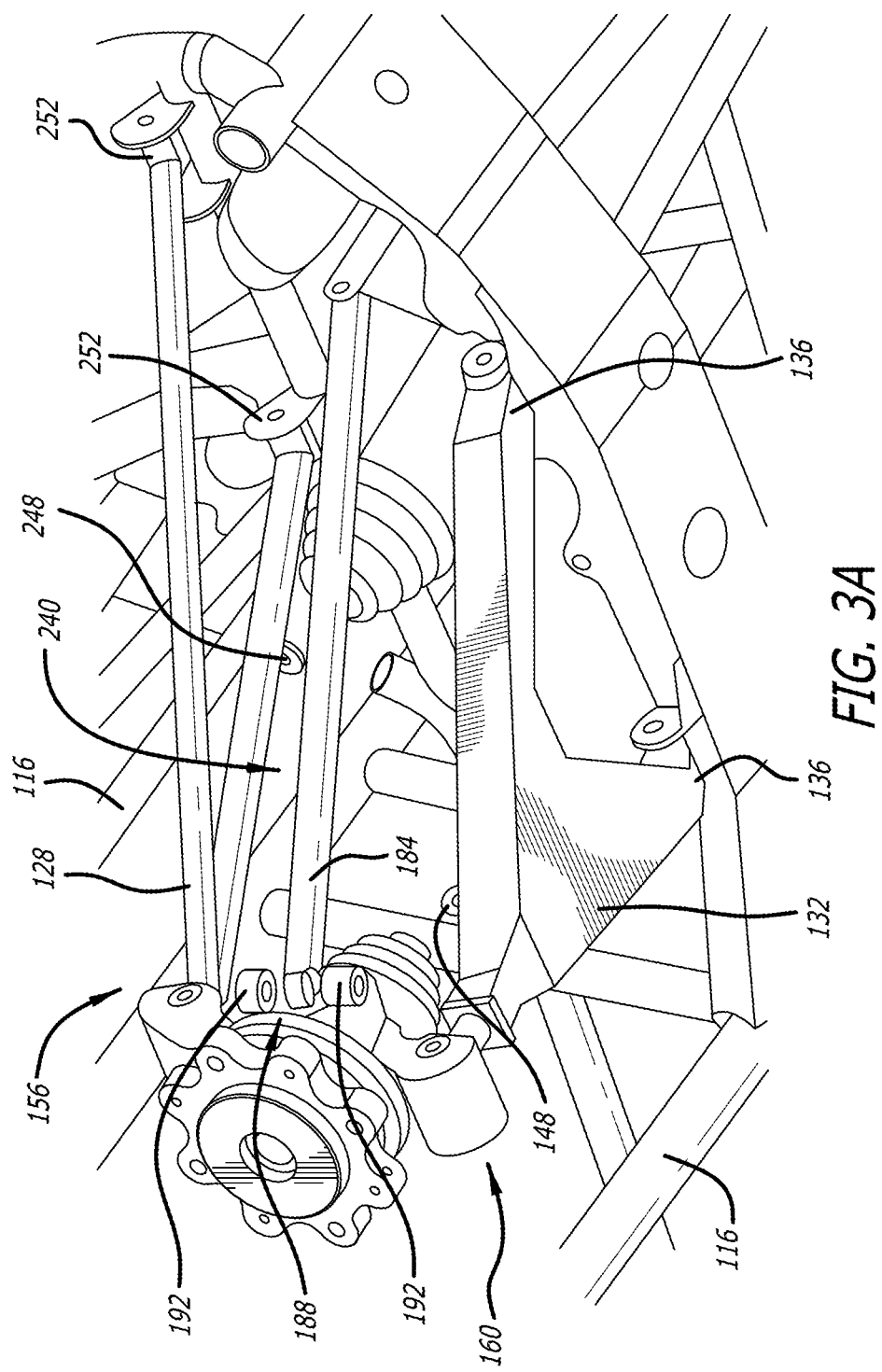
FIG. 3A illustrates a lower isometric view of an exemplary embodiment of a low suspension arm strut coupling that may be incorporated into the front suspension of the off-road vehicle.
Figure 3B:
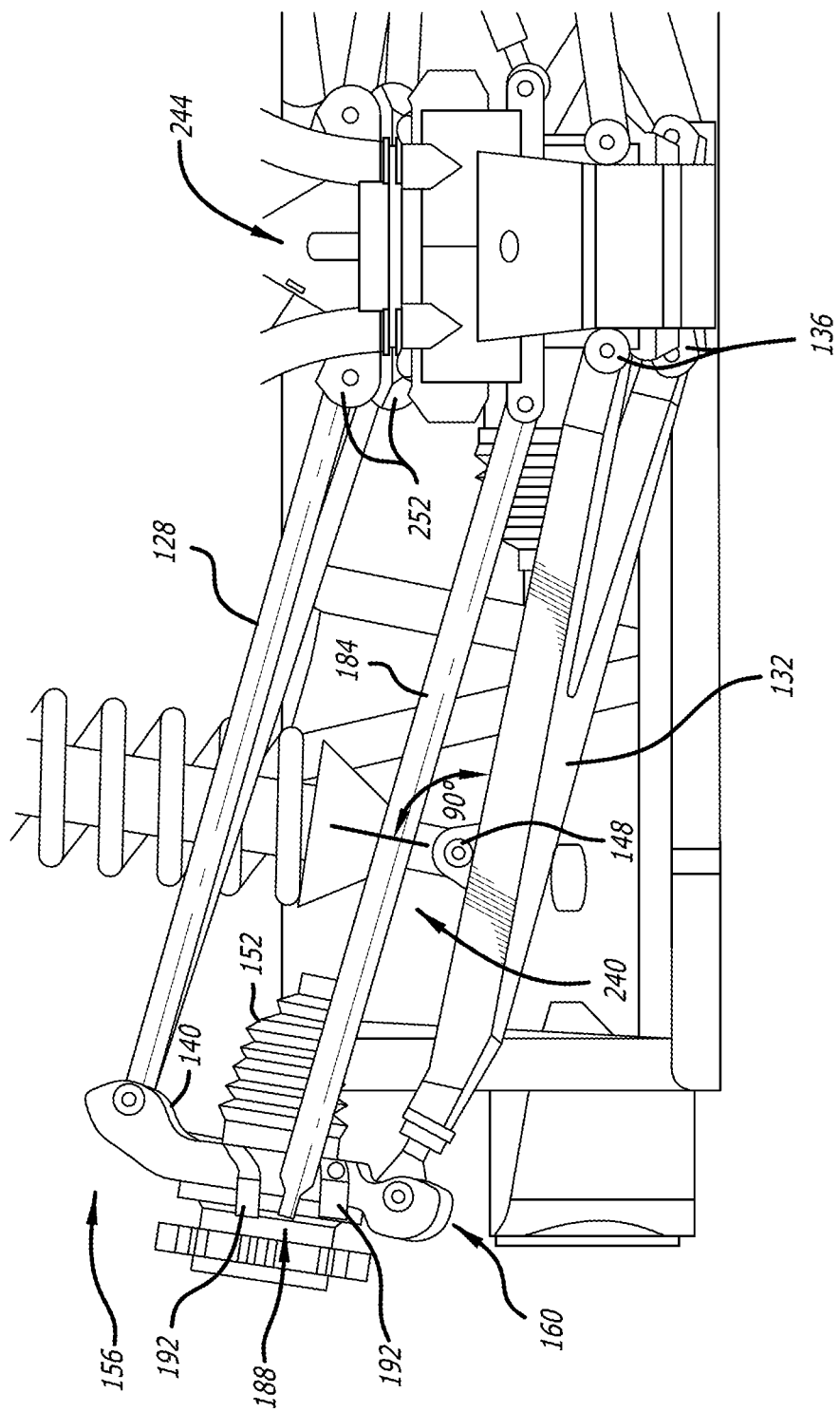
FIG. 3B illustrates a front plan view of the low suspension arm strut coupling of FIG. 3A.

FIGS. 3A-3B illustrate an exemplary embodiment of a leading-edge steering system 240 that is advantageously incorporated into the front suspension of the off-road vehicle 100. Similar to the embodiment illustrated in FIG. 3, the leading-edge steering system 240 is comprised of a steering rod 184 that is coupled with the spindle assembly 140 by way of a rod-end joint 188 that is disposed forward of the drive axle 146. As disclosed above, the rod-end joint 188 may be of the Heim-joint variety or may be of a bushing variety, such that the rod-end joint 188 allows vertical and horizontal rotational motion of the spindle assembly 140. Opposite of the rod-end joint 188, the steering rod 184 is coupled with a steering gear 244 that is mounted onto a central location of the chassis 116. During operating the off-road vehicle, turning the steering gear 244 clockwise moves the steering rod 184 toward the spindle assembly 140, causing the front wheel 120 to turn rightward. Turning the steering gear 244 moves the steering rod 184 away from the spindle assembly 140, thereby turning the front wheel 120 leftward.

During traveling over rough terrain, the steering rods 184 comprising the leading-edge steering system 240 are exposed primarily to tensile forces, unlike tie-rods comprising conventional trailing-edge steering systems that endure primarily compression forces. It will be recognized by those skilled in the art that although the yield strength of steel generally is independent of tension and compression, the steering rod 184 generally may support a greater load in tension than in compression. As will be appreciated, a tensile force requires all sections of the steering rod 184 to yield before failure of the steering rod may occur, whereas in the case of a compression force, failure of the steering rod 184 due to buckling generally requires a relatively lower force acting at a weakest section of the rod. Under the action of the compression force, therefore, failure of the steering rod 184 may occur when any one section of the steel fails rather than requiring all sections to fail as occurs with tensile forces. As such, the leading-edge steering system 240 is capable of withstanding relatively much greater forces due to rough terrain than may be tolerated by conventional, trailing-edge steering systems.

In the embodiment illustrated in FIGS. 3A-3B, the upper and lower suspension arms 128, 132 are configured for coupling the strut 144 with the lower suspension arm 132, as discussed with respect to FIG. 2. As best shown in FIG. 3B, the lower suspension arm 132 comprises a lower pivot 148 that is configured to receive a lower end of the strut 144. An upper pivot 248, shown in FIG. 3A, is suitably disposed on the chassis 116 and configured to receive an upper end of the strut 144, such that the strut may dampen vertical motion of the upper and lower suspension arms 128, 132 with respect to the chassis 116. Two inboard mounting joints 136 hingedly couple the lower suspension arm 132 with the chassis 116. Similarly, the upper suspension arm 128 is coupled with the chassis 116 by way of two inboard mounting joints 252. The inboard mounting joints 136, 252 generally are of a bushing or rod-end variety and allow vertical rotation of the lower and upper suspension arms 132, 128 with respect to the chassis 116. Further, in some embodiments, the lower suspension arm 132 may be reinforced so as to possess a structural integrity suitable to withstand forces due to strut 144 and the movement of the front wheel 120 as the off-road vehicle 100 travels over bumpy terrain.

As shown in FIG. 3A, the inboard mounting joints 252 are coupled with the chassis 116 forward of the inboard mounting joints 136, thereby positioning at least a portion of the upper suspension arm 128 forward of the lower suspension arm 132. The forward disposition of the upper suspension arm 128 provides clearance for the strut 144 extending from the lower suspension arm 132 to the chassis 116. As disclosed hereinabove, coupling the strut 144 with the lower suspension arm 132 positions the strut between 8 inches and 10 inches lower than the position of the strut when coupled with the upper suspension arm 128. Experimentation has demonstrated that coupling the strut 144 with the lower suspension arm 132 generally establishes a lower center of gravity of the off-road vehicle 100 and a relatively smaller shock angle, as well as eliminating a need for extending the strut towers above the hood of the off-road vehicle 100. Further, in one embodiment coupling the strut 144 with the lower suspension arm 132 provides a substantially 90-degree angle between the strut 144 and the lower suspension arm 132 during full compression of the strut.

Figure 4A:
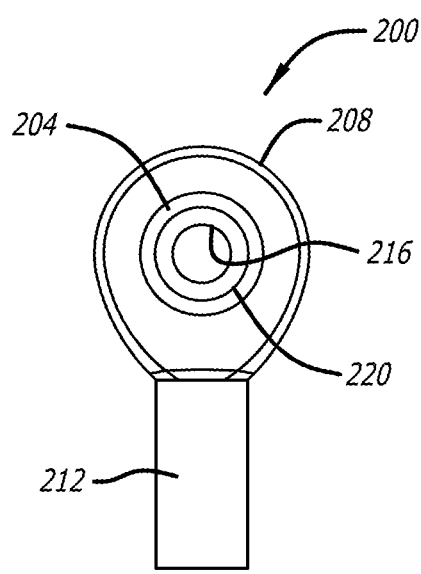
FIG. 4A illustrates a front plan view of an exemplary embodiment of rod-end joint coupling a spindle assembly with a suspension arm.
Figure 4B:
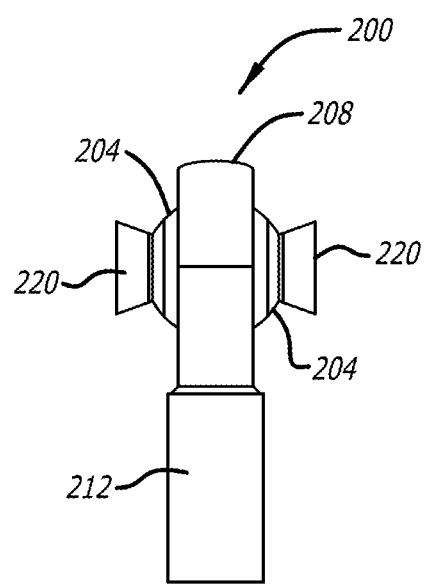
FIG. 4B illustrates a side plan view of the rod-end joint of FIG. 4A.
Figure 5:
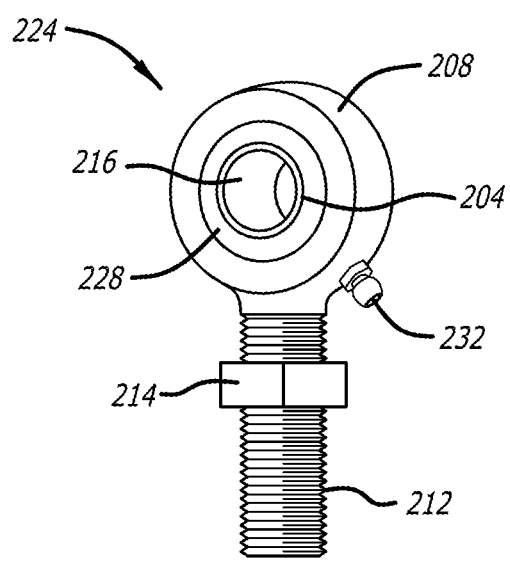
FIG. 5 illustrates a perspective view of an exemplary embodiment of rod-end joint that includes a lubricating race and a lubrication fitting.

FIGS. 4A-4B illustrate an exemplary embodiment of a rod-end 200 that may be pivotally coupled with either of the upper and lower suspension arms 128, 132 of the spindle assembly 140, as described herein. Like the rod-end joints 156, 160, the rod-end 200 is generally of the Heim-joint variety. The rod-end 200 is comprised of a ball 204 that is retained within a casing 208, such that the ball 204 may be rotated within the casing 208. A threaded shank 212, or a weld-in tube end, is fixedly coupled with the casing 208 so as to enable coupling the rod-end to one of the suspension arms 128, 132. The threaded shank 212 may be fixedly coupled with the suspension arm by way of a lock-nut 214 (see FIG. 5) that may be threaded onto the shank 212 and rotated into forcible contact with the suspension arm. It is contemplated that the threaded shank 212 may be configured with left-hand threads or right-hand threads, without limitation.

A bore 216 extends through the ball 204 and is configured to receive the bolt 172. The bore 216 and the bolt 172 facilitate mounting the rod-end 200 to the spindle assembly 140. In particular, the bolt 172 may be passed through suitable threaded holes in the prongs 176 and through the bore 216 so as to fixate the ball 204 in the recess 180. With the ball 204 fixated between the parallel prongs 176, the casing 208 and the suspension arm to which the rod-end 200 is fastened may be freely moved with respect to the spindle assembly 140.

As best shown in FIG. 4B, a misalignment spacer 220 may be disposed on each of opposite sides of the ball 204. The misalignment spacers 220 ensure that the ball 204 remains centered within the recess 180, between the parallel prongs 176, while providing a relatively high degree of clearance for rotation of the casing 208 on the ball 204. In some embodiments, the misalignment spacers 220 may be threaded or press-fitted into suitable countersunk holes in the ball 204. In some embodiments, the ball 204 and the misalignment spacers 220 may be machined as a single component comprising an extended ball that may be installed into the casing 208 during manufacturing of the rod-end 200.

In some embodiments, a lubricating race may be incorporated into the rod-end as to ensure sufficient lubrication is available to the ball and casing during operation of the rod-end. For example, in an exemplary embodiment of a rod-end 224, illustrated in FIG. 5, a lubricating race 228 is disposed between the ball 204 and an interior of the casing 208. In some embodiments, the lubricating race 228 may be comprised of a heavy duty, injection molded Teflon impregnated Nylon race that is configured to ensure smooth and precise movement of the ball 204 within the casing 208. In some embodiments, the lubricating race 228 may be comprised of a thin chamber between the ball 204 and an interior of the casing 208. A suitable lubricant, such as a high-quality grease, may be disposed within the thin chamber so as to lubricate movement between the ball 204 and the casing 208. A lubrication fitting 232 may be disposed in the casing 208 and in fluid communication with the thin camber to facilitate periodic replenishment of the lubricant within the thin chamber.

In some embodiments, the rod-ends 200, 224 may be configured to have self-lubricating properties. For example, in some embodiments, the balls and casings 204, 208 may be comprised of stainless steel that is treated with polytetrafluoroethylene (PTFE). It is contemplated that any of various PTFE-based formulations may be applied to the rod-ends 200, 224, without limitation. In some embodiments, PTFE-treated stainless steel balls and casings 204, 208 may be coupled with a lubricating race 228 that is comprised of an injection molded Teflon impregnated Nylon race, without limitation.

It is contemplated that the rod-ends 200, 224 may be treated during manufacturing so as to optimize hardness, strength, durability, and longevity. In some embodiments, the casings 208 may be machined 4130 chromoly, and the balls 204 may be comprised of 52100 bearing steel. The balls and casings 204, 208 may be heat-treated and hard-chrome finished so as to improve strength and corrosion resistance. Further, the balls and casings 204, 208, as well as the race 228, may be cryogenically treated to improve hardness, durability, and wear resistance.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well.

Therefore, the present disclosure is to be understood as not limited by the specific embodiments described herein, but only by scope of the appended claims.

What is claimed is:

1. A front suspension for coupling a front wheel with a chassis of an off-road vehicle, comprising:
    a spindle assembly for mounting the front wheel;
    an upper suspension arm for coupling an upper portion of the spindle assembly to the chassis wherein the upper suspension arm is configured to accommodate the strut being disposed between the lower suspension arm and the chassis wherein the upper suspension arm includes one or more inboard mounting points that are configured to be coupled with locations of the chassis forward of inboard mounting points comprising the lower suspension arm;
    a lower suspension arm for coupling a lower portion of the spindle assembly to the chassis;
    a lower pivot comprising the lower suspension arm for receiving a strut to dampen vertical motion of the lower suspension arm, wherein the lower pivot is configured to cooperate with an upper pivot to couple the strut between the lower suspension arm and the chassis; and
    a leading portion of the spindle assembly for steering the front wheel.

2. A front suspension for coupling a front wheel with a chassis of an off-road vehicle, comprising:
    a spindle assembly for mounting the front wheel;
    an upper suspension arm for coupling an upper portion of the spindle assembly to the chassis;
    a lower suspension arm for coupling a lower portion of the spindle assembly to the chassis;
    a lower pivot comprising the lower suspension arm for receiving a strut to dampen vertical motion of the lower suspension arm the lower pivot is configured to cooperate with an upper pivot to couple the strut between the lower suspension arm and the chassis wherein the lower pivot is configured to cooperate with an upper pivot to provide a substantially 90-degree angle between the strut and the lower suspension arm during full compression of the strut; and
    a leading portion of the spindle assembly for steering the front wheel.

3. A lower suspension arm for a front suspension of an off-road vehicle, comprising:
    one or more inboard mounting points for coupling to a chassis of the vehicle;
    an outboard mounting point for coupling with a spindle assembly;
    a tube end welded to the outboard mounting point for receiving a rod-end joint coupled with the spindle assembly; and
    a lower pivot for coupling to a strut wherein the lower pivot is configured to provide a substantially 90-degree angle between the strut and the lower suspension arm during full compression of the strut.

* * * * *